United States Patent [19]

Fushiki

[11] Patent Number: 5,140,575
[45] Date of Patent: Aug. 18, 1992

[54] OPTICAL DISC PLAYBACK DEVICE INCLUDING DETECTING AND CORRECTING DISC MOUNT ECCENTRICITY

[75] Inventor: Tatsuo Fushiki, Hamamatsu, Japan

[73] Assignee: Yamaha Corporation, Hamamatsu, Japan

[21] Appl. No.: 413,254

[22] Filed: Sep. 27, 1989

[30] Foreign Application Priority Data

Sep. 29, 1988 [JP] Japan .................. 63-245695

[51] Int. Cl.$^5$ .................................. G11B 7/095
[52] U.S. Cl. .................. 369/44.32; 369/44.78
[58] Field of Search ............ 369/44.32, 44.28, 75.2, 369/44.27, 270

[56] References Cited

U.S. PATENT DOCUMENTS

| | | | |
|---|---|---|---|
| 4,365,324 | 12/1982 | Michaelis | 369/44.32 |
| 4,775,966 | 10/1988 | Miura et al. | 369/44.32 |
| 4,805,163 | 2/1989 | Ohnuki | 369/44.32 |
| 4,829,501 | 5/1989 | Seto et al. | 369/75.2 |

Primary Examiner—Roy N. Envall, Jr.
Assistant Examiner—Khoi Truong
Attorney, Agent, or Firm—Spensley Horn Jubas & Lubitz

[57] ABSTRACT

An optical disc playback device capable of detecting a state of a disc which is not set in a normal position on a turntable includes a system control circuit for clamping an optical disc set on a turntable and rotating the optical disc with an optical head being at a standstill in radial direction of the optical disc in a focus-on state, a track crossing detection circuit for detecting a track crossing state of a laser beam spot from a detection signal of the optical head, a track crossing occurrence frequency detection circuit for detecting frequency of occurrence of track crossing detected by the track crossing detection circuit, an abnormal-state-of-mounting judging circuit for judging existence of an abnormal state of mounting of the disc on the turntable if the frequency of occurrence of track crossing is higher than a value set as indicating the abnormal state of mounting, and an abnormal-state-of-mounting elimination control circuit for performing, when the abnormal state of mounting has been detected, stopping of the optical disc or displaying of the abnormal state of mounting or other control necessary for eliminating the abnormal state of mounting.

17 Claims, 5 Drawing Sheets

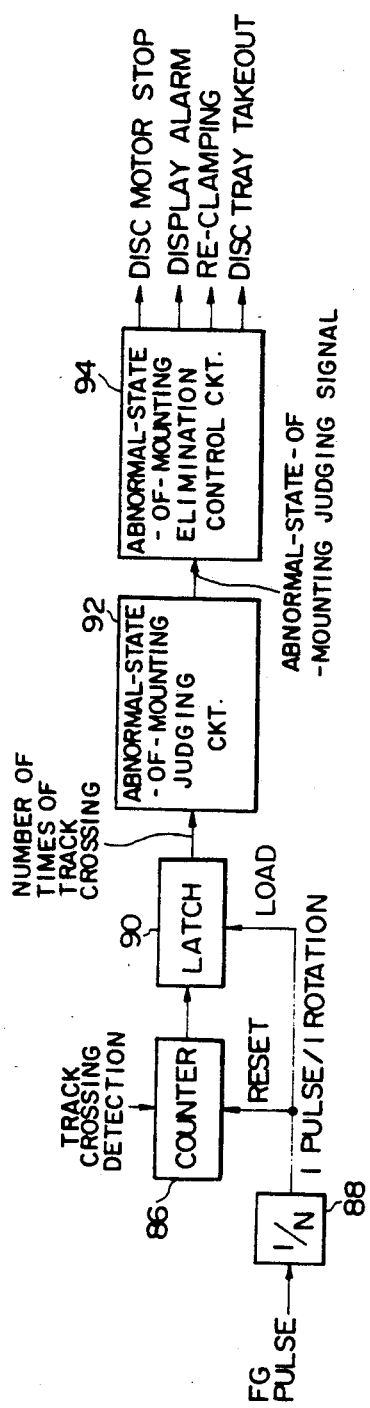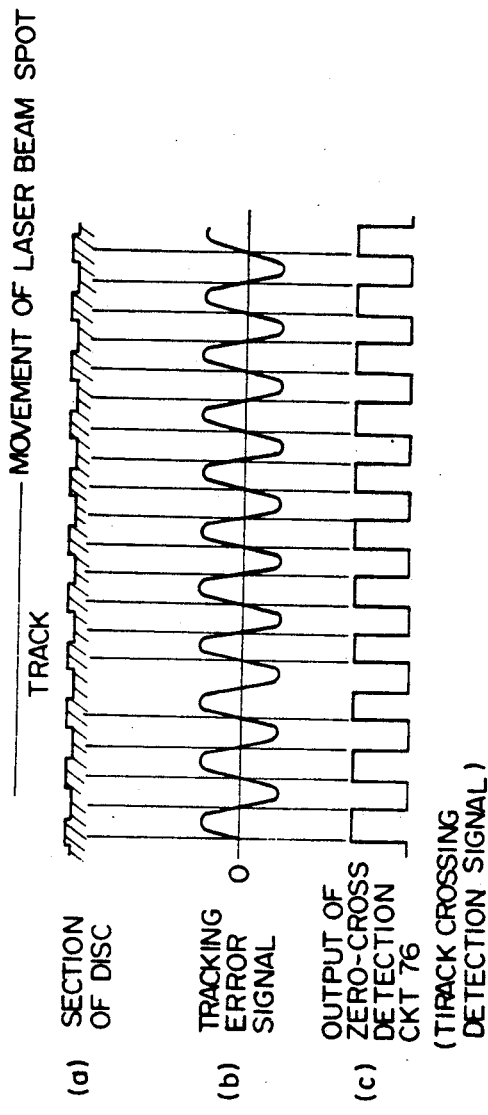

OPTICAL DISC PLAYBACK DEVICE INCLUDING DETECTING AND CORRECTING DISC MOUNT ECCENTRICITY

BACKGROUND OF THE INVENTION

This invention relates to an optical disc playback device such as a CD (Compact Disc) player, a CDV (Compact Disc with Video) player, an LV (Laser Vision Disc) player or a compatible type player capable of playing back two or more of CD, CDV and LV and, more particularly, to an optical disc playback device capable of detecting a state of a disc which is not set in a normal position on a turntable and thereby preventing damage to the device or the disc due to abnormal vibration and also preventing abnormal reproduction of a recorded signal from the disc.

In an optical disc playback device such as a CD player, a CDV player, an LV player or a compatible type player, as shown in FIG. 2, a disc 10 is mounted by inserting a projection 16 of a turntable 14 in a central opening 12 of the disc 10 and clamping the disc 10 by a clamper 18 on the opposite side of the disc 10.

The size of the central opening 12 of a disc is standardized in such a manner that different types of discs have different sizes, e.g., a CD has a diameter of 15 mm and an LV has a diameter of 35 mm. For this reason, in a compatible type player for, for example, a CD (or CDV) and an LV in which these different types of discs are mounted on the same turntable, as shown in FIG. 3, a projection 20 of a large diameter for mounting an LV thereon and a projection 22 of a small diameter for mounting a CD (or CDV) thereon are formed in the central portion of a tuntable 24. In mounting an LV 28 having a central opening 26 of a large diameter on the turntable 24 of such structure, however, there often occurs a case where, as shown in FIG. 3, the LV 28 is mounted on the turntable 24 with the projection 22 of a small diameter erroneously engaging the central opening 26 and being clamped by a clamper 30 in this state. This is particularly the case with an LV of a diameter of 20 cm. Lacking any means for detecting such abnormal state of mounting, the prior art optical disc playback device continues rotation of the turntable with resulting occurence of an abnormal vibration or a damage to the device or the disc.

Likewise in an optical disc playback device other than a compatible type player such as described above, in a case where, as shown in FIG. 4, a central opening 34 of a disc 32 has a larger diameter than a standard diameter due to error in the manufacture, the disc 32 is likely to be mounted on a projection 38 of a turntable 36 in an offset state and clamped by a clamper 40 in this offset state. In this case, tracking servo cannot work properly with resulting occurrence of an abnormal playback.

It is, therefore, an object of the invention to provide an optical disc playback device capable of eliminating the above described drawbacks of the prior art optical disc playback device and by detecting an abnormal state of mounting of a disc on a turntable and thereby preventing damage to the device and disc due to abnormal vibration and also preventing abnormal playback.

SUMMARY OF THE INVENTION

The optical disc playback device achieving the above described object of the invention comprises system control means for clamping an optical disc set on a turntable and rotating an optical disc with an optical head being at a standstill in radial direction of the optical disc in a focus-on state, track crossing detection means for detecting a track crossing state of a beam spot from a detection signal of the optical head, track crossing occurrence frequency detection means for detecting frequency of occurrence of track crossing detected by said track crossing detection means, abnormal-state-of-mounting judging means for judging existence of an abnormal state of mounting of the disc on the turntable if the frequency of occurrence of track crossing is higher than a value set as indicating the abnormal state of mounting, and abnormal-state-of-mounting elimination control means for performing, when the abnormal state of mounting has been detected, stopping of the optical disc rotation or displaying of the abnormal state of mounting or other control necessary for eliminating the abnormal state of mounting.

If the optical head is at a standstill in the radial direction of the disc and the disc is mounted correctly on the turntable, the center of the disc and the center of rotation are concentric with each other so that locus of a laser beam spot on the disc nearly follows a track as shown in FIG. 5 with a result that frequency of occurrence of track crossing of the laser beam spot is relatively low. In contrast thereto, if the state of mounting of the disc is abnormal as shown in FIG. 3 or 4, the center of the disc becomes eccentric with respect to the center of rotation so that the locus of the beam spot on the disc does not follow a track at all as shown in FIG. 6 with a result that frequency of occurrence of track crossing becomes high.

Accordingly, an abnormal state of mounting of a disc can be eliminated by detecting this track crossing, judging that there exists an abnormal state of mounting if frequency of occurrence of track crossing is high enough for enabling one to consider existence of such abnormal state of mounting and thereupon stopping rotation of the disc, or displaying the abnormal state of mounting or otherwise causing an action to be taken for eliminating the abnormal state of mounting of the disc.

An embodiment of the invention will now be described with reference to the accompanying drawings.

BRIEF DESCRIPTION OF THE DRAWINGS

In the accompanying drawings,

FIG. 7 is a block diagram showing an example of detection of an abnormal state of mounting and control for eliminating it in a system controller in FIG. 1;

FIG. 8 is a waveform diagram showing the track crossing detection operation carried out in the circuit of FIG. 1.

DESCRIPTION OF A PREFERRED EMBODIMENT

A preferred embodiment of the invention will now be described. In this embodiment, track crossing is detected by detecting zero crossing of a tracking error signal. Frequency of occurrence of track crossing is detected as the number of times of track crossing during single rotation of the disc.

Figure 1:
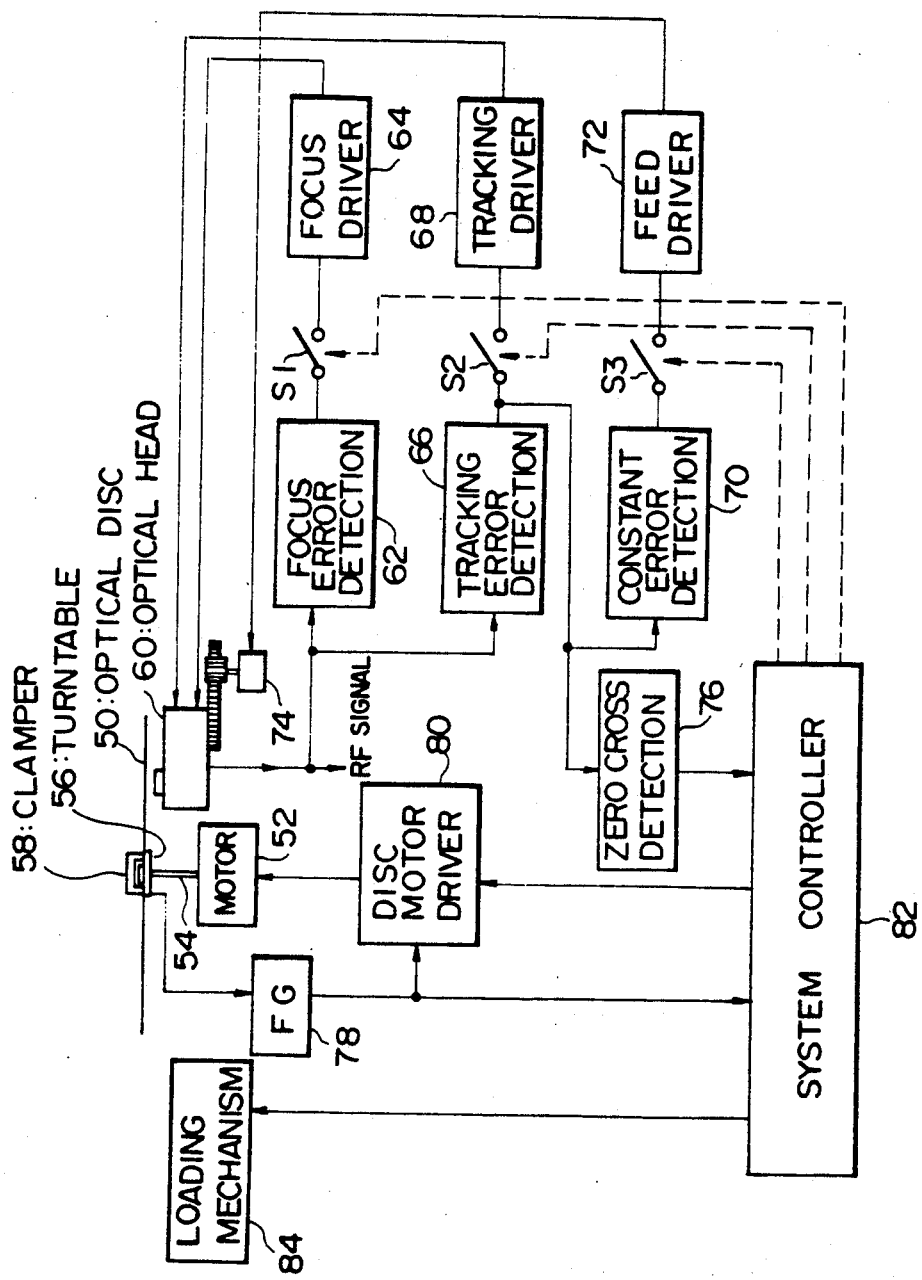
FIG. 1 is a block diagram showing an embodiment of the invention.
Figure 2:
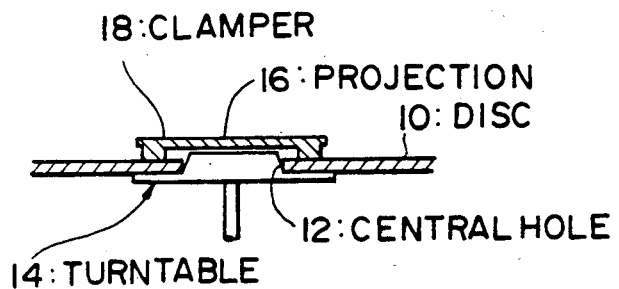
FIG. 2 is a front view, partially sectional, of an example of mounting of a disc on a turntable.

Referring first to FIG. 1, an optical disc 50 is placed on a turntable 56 which is coupled to a motor shaft 54 of a disc motor 52 and clamped on the upper surface thereof by a clamper 58. The clamper 58 is moved vertically to perform a clamping operation by means of a mechanism such as a cam which is interlocked mechanically with a disc receiving operation of a disc tray (not shown) or by means of a separately provided drive source such as an electric motor.

An FG (frequency generator) 78 produces a shot of pulse each time a disc motor 52 is rotated by a predetermined angle. A disc motor driver 80 compares the output pulse of the FG 78 with a reference pulse in frequency and phase, and drives the disc motor 52 in accordance with difference between them thereby performing a rough rotation control.

An optical head 60 irradiates laser beam for reading a signal on a recording surface of the disc 50 and receives its reflected beam. A focus error detection circuit 62 detects a focus error from a received beam signal and supplies a focus error signal to a focus driver 64 through a loop switch S1 thereby driving a focus actuator (not shown) provided in the optical head 60 and thereby performing a focus control. A tracking error detection circuit 66 detects a tracking error from a received beam signal and supplies a tracking error signal to a tracking driver 68 through a loop switch S2 thereby driving a tracking actuator (not shown) provided in the optical head 60 and thereby performing a tracking control. A constant error detection circuit 70 detects a direct current component of the tracking error signal, i.e., a constant error of the tracking error, and supplies it to a feed driver 72 through a loop switch S3 thereby driving a feed motor 74 to move the optical head 60 in the radial direction of the disc. A zero cross detection circuit 76 detects zero crossing of the tracking error thereby detecting the track crossing state of the laser beam spot. Since, as shown in FIG. 8(b), the tracking error signal performs zero crossing in correspondence to track crossing of the laser beam spot, the zero cross detection circuit 76 detects this zero crossing and thereupon produces a track crossing detection signal as shown in FIG. 8(c).

A system controller 82 controls the entire optical disc playback device, e.g., performing controls including a disc loading control by a loading mechanism 84, various servo controls including on/off operations of the switches S1 to S3 and controls for detection of an abnormal state of mounting of the disc and elimination of the abnormal state of mounting according to the invention. When an abnormal state of mounting has been detected, the system controller 82 causes the focus servo loop switch S1 to be turned on and the tracking servo loop switch S2 and the feed servo loop switch S3 to be turned off. An example of the controls for detection of an abnormal state of mounting and elimination of the abnormal mounting by the system controller 82 is shown in FIG. 7. A counter 86 detects frequency of occurrence of track crossing by counting a track crossing detection signal shown in FIG. 8(c). A frequency divider 88 frequency-divides the output pulse of the FG 78 which produces N pulses in one rotation by N thereby producing a shot of pulse for each single rotation. The counter 86 is reset each time this pulse is applied thereto (i.e., each one rotation). A count immediately before resetting (i.e., the number of track crossing during one rotation) is latched by a latch circuit 90.

An abnormal-state-of-mounting judging circuit 92 judges existence of an abnormal state of mounting if it has been detected once or several times consecutively that the number of track crossing latched by the latch circuit 90 exceeds the number of times set as indicating an abnormal state of mounting. Upon detection of the abnormal state of mounting, the judging circuit 92 produces an abnormal-state-of-mounting judgement signal.

Figure 3:
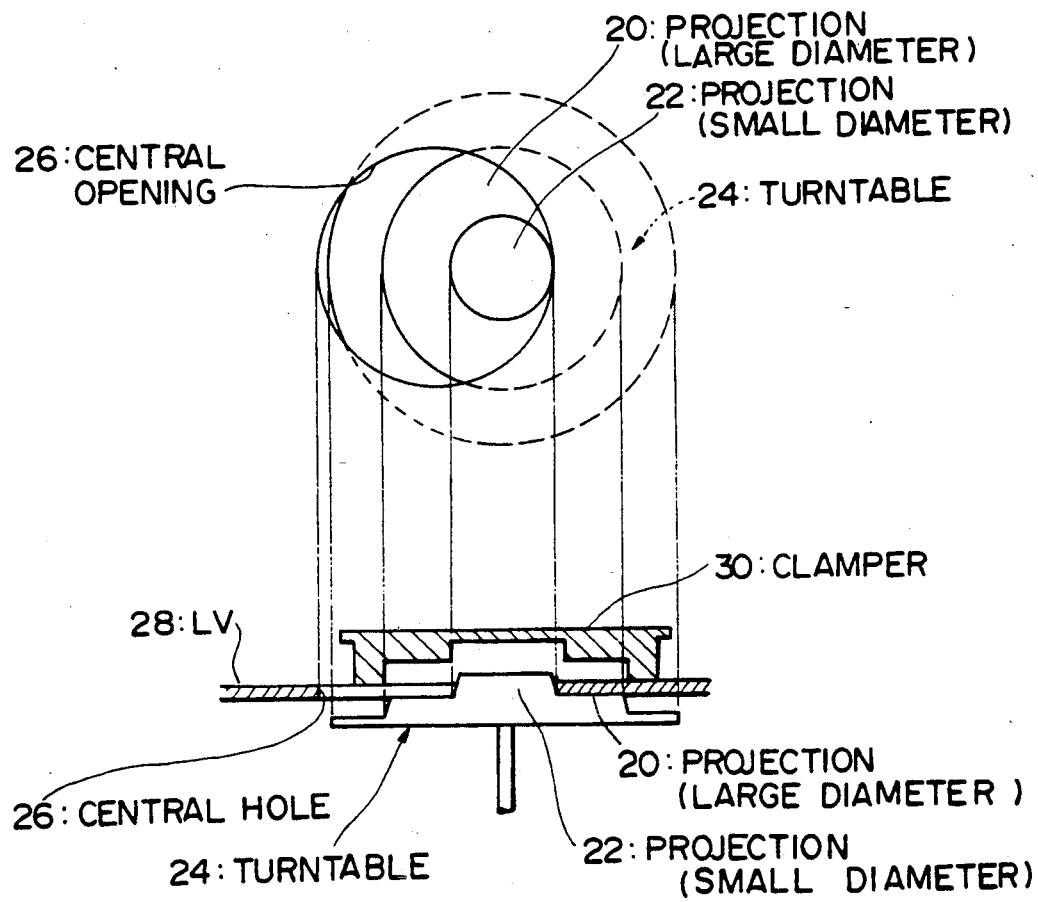
FIG. 3 is a front view, partially sectional, of an example of abnormal state of mounting of a disc and a partial plan view thereof shown with a clamper 30 being removed.
Figure 4:
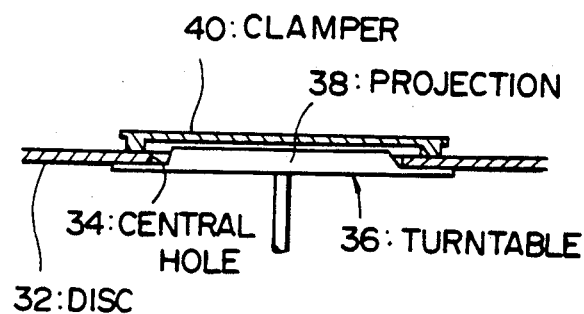
FIG. 4 is a front view, partially sectional, of another example of abnormal state of mounting of a disc.
Figures 5, 6:
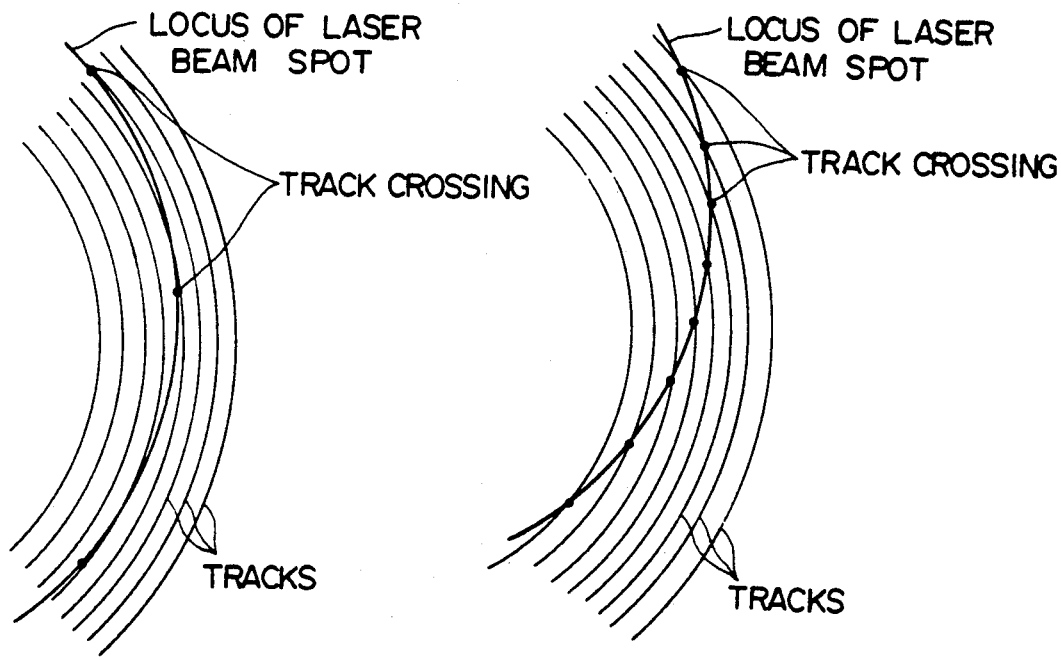
FIG. 5 is a view showing a locus of laser beam spot on a disc when the disc is mounted normally and is rotated in a tracking-servo-off mode.
FIG. 6 is a view showing a locus of laser beam spot on a disc when the disc is mounted in an abnormal state and is rotated in a tracking-servo-off mode.

An abnormal-state-of-mounting elimination control circuit 94 performs when existence of the abnormal state of mounting has been judged, stopping of the disc motor 52, displaying or alarming of the abnormal state of mounting, re-clamping of the disc, taking out of the disc tray or other controls necessary for elimination of the abnormal state of mounting. In case the disc motor 52 is stopped or displaying or alarming of the abnormal state of mounting is made, the user is informed of existence of the abnormal state of mounting and thereby is urged to take an action necessary for eliminating the abnormal state of mounting (e.g., opening the disc tray and set the disc again). In case the disc clamping is made again, the abnormal state of mounting shown in FIG. 3 or 4 may be eliminated, in some cases, by lifting the clamper 58 automatically and lowering it again on the disc. In case the disc clamping is interlocked mechanically with moving in and out of the disc tray, the disc re-clamping operation is accompanied by moving of the disc tray and there is high possibility that the abnormal state of mounting shown in FIG. 3 or 4 is eliminated by shock caused by the moving of the disc tray. In case the disc tray is taken out, the user is thereby urged to manually set the disc on the disc tray again whereby the abnormal state of mounting can be eliminated without fail.

As to the control for eliminating the abnormal state of mounting, different controls may be made in accordance with the degree of the abnormal state of mounting. If, for example, the abnormal state of mounting is of a relatively small degree, rotation of the disc is stopped and disc clamping is made again whereas if the abnormal state of mounting is in a relatively serious stage or the number of times of disc re-clamping operations has exceeded a predetermined number, the disc tray is taken out to urge the user to correctly set the disc on the tray.

An example of operations at the starting time of the above embodiment of the optical disc playback device according to the invention will be described with reference to FIG. 9.

First, the disc 50 is placed on the disc tray and the disc tray is closed (step P1). The disc 50 thereby is placed on the turntable 56 and clamped by the clamper 58. Then, the optical head 60 is moved to a read-in area on the disc 50 and the focus servo loop switch S1 is turned on whereas the tracking servo loop switch S2 and the feed servo loop switch S3 are respectively turned off (step P2).

Then, the disc 50 is rotated (step P3. in this step, the rotation speed need not be a regular rotation speed) and an abnormal state of mounting is detected (step P4). In this step, the number of track crossing per one rotation is detected by the circuit of FIG. 7, existence of the abnormal state of mounting is judged when the number of track crossing exceeds the number set as indicating the abnormal state of mounting, and thereupon the rotation of the disc is stopped (step 5). If the abnormal state of mounting has not been detected, the processing proceeds to a playback standby mode (step P6) where playback of the disc is started upon turning on of a playback button.

Figure 9:
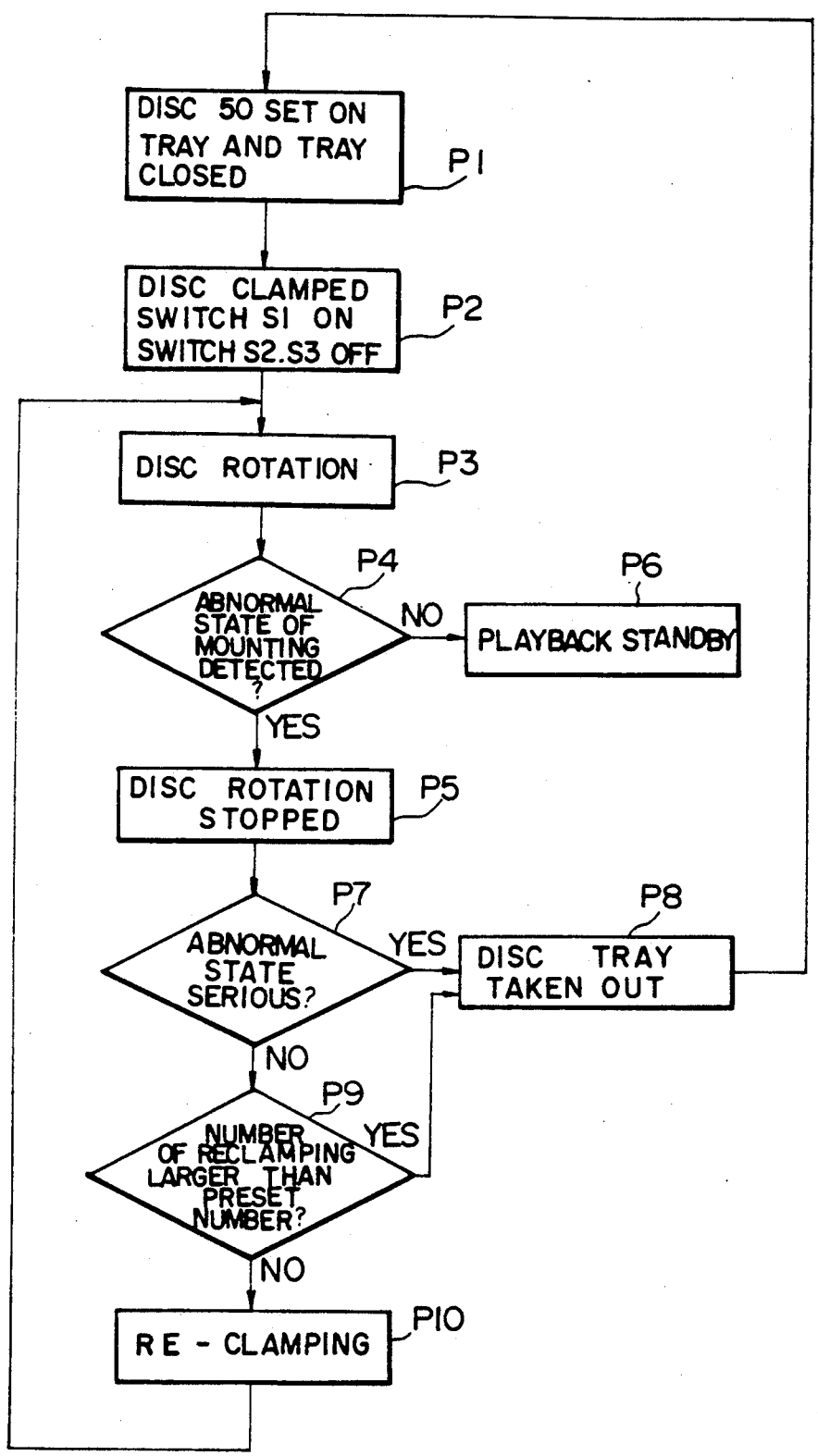
FIG. 9 is a flow chart showing the detection of an abnormal state of mounting and control for eliminating it according to the circuit of FIG. 7.

In the example of FIG. 9, when existence of the abnormal state of mounting has been judged, the control for elimination of the abnormal state of mounting is made to differ depending upon the degree of the abnormal state of mounting. More specifically, the degree of the abnormal state of mounting is detected (step P7). If the abnormal state is of a serious degree, the disc tray is taken out (step P8) to urge the user to set the disc again. If the abnormal state is of a relatively slight degree, clamping of the disc is made again (step P10). The number of re-clamping is detected (step P9) and, when the number of re-clamping is larger than a predetermined number, the disc tray is taken out (step P8) to urge the user to set the disc again.

Upon re-clamping, the disc is rotated again (step P3) and this operation is repeated until the abnormal state of mounting has ceased to be detected. By this operation, the disc is finally mounted correctly on the turntable 56 and the playback standby mode is brought about (step P6). Thus, by turning on of the playback button, playback of the disc can be started.

In the above described embodiment, the frequency of occurrence of track crossing is detected by detecting the number of track crossing per one rotation of the disc. Frequency of occurrence of track crossing may also be detected by detecting the number of track crossing for a predetermined rotation angle of the disc. Alternatively, a disc rotation angle in which a predetermined number of track crossing is made may be detected and existence of the abnormal state of mounting may be judged when this disc rotation angle is smaller than a predetermined angle. In case the FG 78 is not used, number TN of track crossing for a predetermined period of time ΔT may be counted and existence of the abnormal state may be judged when this count TN is larger than a reference value or when average track crossing time ΔT/TN is smaller than a reference value.

In the above described embodiment, track crossing is detected by zero crossing of the tracking error signal. Track crossing may also be detected by using change in the level of an RF signal or of a focus error signal or other information which changes due to track crossing of a laser beam spot.

In the above described embodiment, track crossing is detected with the tracking servo loop being in an off state. When an abnormal state of mounting occurs, however, track crossing occurs because the tracking servo cannot work even if the tracking servo is in an on state so that track crossing may be detected with the tracking servo loop being in an on state. As a structure for keeping the optical head at a standstill in the radial direction, a mechanical fixing means may be positively employed or an electrical braking means may be separately provided.

What is claimed is:

1. An optical disc playback apparatus including a turntable and an optical head, the apparatus comprising:
   control means including clamping means for clamping an optical disc set on the turntable and rotating means for rotating the optical disc, the optical head being maintained stationary in a radial direction of the optical disk and focusing a light beam on the optical disc;
   detection means for detecting a track crossing state of the light beam from the optical head;
   frequency detection means for detecting a frequency of track crossing detected by said detection means;
   determining means for determining a state of mounting of the optional disc on the turntable, wherein if the frequency of track crossing is higher than a predetermined value the state of mounting is determined to be abnormal; and
   disc adjust means, responsive to a determination of an abnormal state of mounting, for adjusting the optical disc to eliminate the abnormal state of mounting.

2. An optical disc playback device as defined in claim 1, including display means for displaying an indication of the abnormal state of mounting.

3. An optical disc playback device as defined in claim 1 wherein the disc adjust means includes display means for displaying an indication of the abnormal state of mounting.

4. An optical disc playback device as defined in claim 3 wherein the determining means determines a degree of abnormal state of mounting of the optical disc, and wherein the disc adjust means stops rotation of the optical disc and signals the control means to clamp the optical disc again when the degree of the abnormal state of mounting is less than a first predetermined amount and wherein the disc adjust means signals the control means to stop rotation of the optical disc when the degree of the abnormal state of mounting is more than a second predetermined amount.

5. An optical disc playback device as defined in claim 3 wherein the disc adjust means signals the control means to stop rotation of the optical disc and causes an in response to a determination of an abnormal state of mounting, the disc adjust means further including alarm means for issuing an alarm when the abnormal state of mounting is determined.

6. An optical disc playback device as defined in claim 4 wherein the degree of the abnormal state of mounting is more than the second predetermined amount when reclamping of the optical disc has exceeded a predetermined number.

7. An optical disc playback device as defined in claim 5 wherein the degree of the abnormal state of mounting is more than the second predetermined amount when reclamping of the optical disc has exceeded a predetermined number.

8. An optical disc playback device as defined in claim 1 wherein the frequency of track crossing is detected by detecting the number of times the light beam from the optical head crosses a track on the optical disc per one rotation of the optical disc.

9. An optical disc playback device as defined in claim 1 wherein the frequency of track crossing is detected by the number of times the light beam from the optical head crosses a track on the optical disc for a predetermined rotation angle of the optical disc.

10. An optical disc playback device as defined in claim 1 wherein the frequency of occurence of track crossing is detected by detecting a rotation angle in which a predetermined number of track crossings occur and the determining means determines the abnormal state of mounting when the detected rotation angle is smaller than a reference value.

11. An optical disc playback device as defined in claim 1 wherein the frequency of occurrence of track crossing is detected by counting the number of times a track crossing occurs in a predetermined period of time, wherein the determining means determines the abnormal state of mounting when the count is larger than a reference value or when average track crossing time is smaller than a reference value.

12. An optical disc playback device as defined in claim 1 wherein the disc adjust means signals the control means to unclamp and reclamp the optical disc in response to the determination of an abnormal state of mounting.

13. An optical disc playback device as defined in claim 1, further including a movable disc tray for supporting the optical disc therein, wherein the control means controls movement of the disc tray and wherein the disc adjust means signals the control means to move the disc tray in response to the determination of an abnormal state of mounting.

14. An optical disc playback device as defined in claim 12, including display means for displaying an indication of the abnormal state of mounting.

15. An optical disc playback device as defined in claim 13, wherein the disc adjust means includes display means for displaying an indication of the abnormal state of mounting.

16. An optical disc playback device as defined in claim 1, wherein the turntable comprises a turntable having a plurality of disc mounting sections for mounting a plurality of optical discs having different sizes.

17. An optical disc playback device as defined in claim 4, further including a movable disc tray for supporting the optical disc therein, wherein the control means controls movement of the disc tray and wherein the disc adjust means signals the control means to move the disc tray when the degree of the abnormal state of mounting is more than the second predetermined amount.

* * * * *